(12) United States Patent
Chen et al.

(10) Patent No.: US 12,529,313 B2
(45) Date of Patent: Jan. 20, 2026

(54) FRAGMENTATION GEOREFERENCING

(71) Applicant: Orica International Pte Ltd, Singapore (SG)

(72) Inventors: Benny Chen, Melbourne (AU); Michael Ody, Melbourne (AU); Meyrick Kirby, Melbourne (AU)

(73) Assignee: Orica International Pte Ltd., Singapore (SG)

( * ) Notice: Subject to any disclaimer, the term of this patent is extended or adjusted under 35 U.S.C. 154(b) by 150 days.

(21) Appl. No.: 18/555,675

(22) PCT Filed: Apr. 19, 2022

(86) PCT No.: PCT/AU2022/050355
§ 371 (c)(1),
(2) Date: Oct. 16, 2023

(87) PCT Pub. No.: WO2022/221912
PCT Pub. Date: Oct. 27, 2022

(65) Prior Publication Data
US 2024/0200446 A1    Jun. 20, 2024

(30) Foreign Application Priority Data

Apr. 19, 2021 (AU) ................................ 2021901147

(51) Int. Cl.
*E21C 35/06* (2006.01)
*E21C 35/20* (2006.01)
(Continued)

(52) U.S. Cl.
CPC .............. *E21C 35/06* (2013.01); *E21C 35/20* (2013.01); *G01B 11/026* (2013.01);
(Continued)

(58) Field of Classification Search
CPC ....... E21C 35/06; E21C 35/24; H04N 13/239; G01S 19/485; G01B 11/026
See application file for complete search history.

(56) References Cited

U.S. PATENT DOCUMENTS 11,536,004 B2 * 12/2022 Wu ........................ E02F 9/2029
2007/0151471 A1 * 7/2007 La Rosa .................. E21C 39/00
102/301
(Continued)

FOREIGN PATENT DOCUMENTS

CA    3029812 C * 7/2020 ............. B60K 35/00
CA    3102035 C * 5/2021 ............. E02F 9/205
(Continued)

OTHER PUBLICATIONS

Van Der Marel, H. Reference System for Surveying and Mapping, Lecture notes, Aug. 2014. [Retrieved from internet on Jun. 30, 2021] <URL: http://gnss1.tudelft.nl/pub/vdmare/reader/CTB3310_RefSystems_1-2a_online.pdf> whole document.
(Continued)

*Primary Examiner* — Jong-Suk (James) Lee
(74) *Attorney, Agent, or Firm* — Kilpatrick Townsend & Stockton LLP

(57) ABSTRACT

A system for determining locations of blast fragments may include: a three-dimensional (3D) imaging system mounted on an excavation device and configured for viewing a portion of a pile of blast fragments and configured for capturing at least one image of the viewed portion of the pile of blast fragments; a positioning system configured for providing a location and heading of the excavation device; and a processor. The processor may be configured to execute instructions to perform image processing operations upon the images of the viewed portion of the pile of blast fragments, to: identify a reference location in the viewed portion of the pile of blast fragments; determine the refer- (Continued)

ence location in a geographic coordinate system; identify a plurality of individual blast fragments in the viewed portion of the pile of blast fragments; and determine a distinct geographic coordinate corresponding to each of the plurality of individual blast fragments.

20 Claims, 6 Drawing Sheets

(51) Int. Cl.
  *G01B 11/02* (2006.01)
  *G01S 19/48* (2010.01)
  *H04N 13/133* (2018.01)
  *H04N 13/239* (2018.01)

(52) U.S. Cl.
  CPC ......... *G01S 19/485* (2020.05); *H04N 13/133* (2018.05); *H04N 13/239* (2018.05)

(56) References Cited

U.S. PATENT DOCUMENTS

| | | | | |
|---|---|---|---|---|
| 2009/0259373 | A1* | 10/2009 | Nichols | E02F 9/264 |
| | | | | 701/50 |
| 2010/0329542 | A1* | 12/2010 | Ramalingam | G06T 7/80 |
| | | | | 348/118 |
| 2014/0188333 | A1* | 7/2014 | Friend | E02F 9/261 |
| | | | | 701/34.4 |
| 2017/0067341 | A1 | 3/2017 | Baiden | |
| 2017/0287124 | A1* | 10/2017 | Lim | G06T 7/74 |
| 2019/0003153 | A1 | 1/2019 | Shike et al. | |
| 2019/0012768 | A1 | 1/2019 | Tafazoli Bilandi et al. | |
| 2020/0018049 | A1 | 1/2020 | Takahama et al. | |
| 2020/0058177 | A1 | 2/2020 | Kawamot et al. | |
| 2024/0011244 | A1* | 1/2024 | Wei | E02F 9/262 |

FOREIGN PATENT DOCUMENTS

| | | | | |
|---|---|---|---|---|
| CN | 102496004 | B * | 11/2013 | |
| CN | 108885102 | A * | 11/2018 | ................ E02F 9/20 |
| EP | 3499438 | A1 | 6/2019 | |
| JP | 2016160741 | A * | 9/2016 | ................ B60R 1/00 |
| JP | 2018059400 | A | 4/2018 | |
| JP | 2021008754 | A | 1/2021 | |
| WO | WO-2018183114 | A1 * | 10/2018 | ........... E01C 19/006 |
| WO | WO-2022175949 | A1 * | 8/2022 | ............... E02F 9/261 |
| WO | WO-2024011018 | A1 * | 1/2024 | ............ B60W 30/09 |

OTHER PUBLICATIONS

Wolf, P.R. et al. Coordinate Transformations, Chapter of 'Elements of Photogrammetry with Applications in GIS', Fourth Edition, McGraw-Hill Education, 2014. <URL:https://www.accessengineeringlibrary.com/content/book/97800717611123/back-matter/appendix3> whole document.

International Search Report and Written Opinion, issued by the Australian Patent Office, as International Searching Authority for PCT/AU2022/050355 on Jun. 27, 2022, 16 pages.

"Opponent's Writs" issued by the Chilean Patent Office for CL Application No. 202303112, on Apr. 28, 2025, 10 pages.

* cited by examiner

FRAGMENTATION GEOREFERENCING

CROSS REFERENCE TO RELATED APPLICATIONS

The present application is a U.S. National Stage of International Application No. PCT/AU2022/050355, filed on Apr. 19, 2022, which claims priority to Australian Application No. 2021901147, filed on Apr. 19, 2021, both of which are incorporated by reference herein in their entireties.

TECHNICAL FIELD

The present disclosure relates to the field of mining. More particularly, the disclosure relates to methods and devices for accurately identifying, locating and tracking fragmentation material such as blasted rock fragments, produced in association with or resulting from mining operations.

BACKGROUND

There may be a need for achieving greater efficiency in mining operations, which may involve measured outcomes in all aspects of mining operations from the initial understanding of the resource, through planning of blasting operations, to characterisation of the results of blasting and monitoring of downstream processing. It is understood that overall efficiency of mining operations is impacted by optimisation at all stages.

By way of a simple example, careful planning of blasting operations can result in a narrow range of sizes of the resulting fragmentation, which means less variety of equipment is needed for downstream processing. In contrast, poor blast planning can mean the resulting fragmentation includes very large rocks that require a larger, more expensive shovel for handling and post-blast preliminary crushing, which adds cost.

It is a well-known maxim that you can't manage what you don't measure. It is therefore preferable for efficient mining operations that measurements are made throughout the process, e.g., at all stages. One stage that may be inadequately measured at the present time is post-blast fragmentation. Specifically, there may not exist an effective system for automated capture and reporting of fragmentation data, especially at the muck pile where a shovel is collecting blasted rock fragments that are loaded into a truck or onto a conveyor for downstream processing. Accurate and timely data about rock size and location may provide useful feedback for improving the blasting process, and may provide useful feed-forward data for planning handling and crushing operations.

There are two aspects to characterising the muck pile. First is to characterise rocks in the muck pile, specifically in regard to size and shape. The second is to locate the working area in which each rock is located. One technique for the first aspect is described in United States patent application number US2019/0012768, assigned to Motion Metrix International Corp. The Motion Metrix patent application describes using a convolutional neural network to identify pixel data associated with an image. The neural network is trained using previous images of fragmented material.

The Motion Metrix approach is only one of a number of approaches to identifying rocks. Other techniques include edge detection, surface analysis, and hyperspectral analysis. Persons skilled in the art may be aware of other suitable techniques.

However, identifying rocks, or even boundary areas, may be of little worth unless the precise location can be determined. Once location is accurately known it may be possible to conduct analytics on the effectiveness of the blast that produced the muck pile, and to plan the required downstream processing resources. Unfortunately, no suitable techniques are known.

One technique is also described by Motion Metrix International Corp in United States Patent number U.S. Pat. No. 8,843,279. This patent describes an apparatus and method for determining a spatial position of loading equipment, however it does not describe how to obtain the spatial position of the fragments. It is therefore not useful for characterising the fragments resulting from a blast.

It is desired to address one or more problems or limitations in the prior art, e.g., as indicated hereinbefore, or to at least provide a useful alternative.

SUMMARY

In accordance with an aspect of the present disclosure, a system for determining locations of blast fragments includes: a 3D imaging system mounted on an excavation device and configured for viewing a portion of a pile of blast fragments and configured for capturing at least one image of the viewed portion of the pile of blast fragments; a positioning system configured for providing a location and heading of the excavation device; a processor configured to execute program instructions to process signals from the 3D imaging system, including by performing image processing operations upon the at least one image of the viewed portion of the pile of blast fragments, to: identify a reference location (which may be referred to as a 'first location') in the viewed portion of the pile of blast fragments; determine the reference location in a geographic coordinate system; identify a plurality of individual blast fragments in the viewed portion of the pile of blast fragments; and determine a distinct geographic coordinate corresponding to each of the plurality of individual blast fragments.

In accordance with a further aspect of the present disclosure, each distinct geographic coordinate can include or be a set of coordinates in a mine coordinate system or the Universal Transverse Mercator (UTM) geographic coordinate system.

The viewed portion of the pile of blast fragments can include or be a current in situ dig face of a muck pile to which material excavation operations are to be directed.

The 3D imaging system may be intentionally/specifically configured for preferentially viewing and imaging the current in situ dig face of the pile of blast fragments.

More particularly, the 3D imaging system can be intentionally/specifically configured relative to the excavation device such that during an initial part of each of a plurality of material excavation operations directed to the in situ dig face, (a) the field of view of the 3D imaging system preferentially views the current in situ dig face and/or a target portion thereof; and (b) the 3D imaging system preferentially captures at least one image of the current in situ dig face and/or a target portion thereof.

The 3D imaging system can be specifically configured for manually and/or automatically triggering the image processing operations (to select one of the at least one captured images for the processing). The 3D imaging system can be specifically configured for automatically triggering the image processing operations based on one or more of the following trigger criteria being met by the at least one captured image: an exposure value of the at least one image being within a preselected range; a measured difference between the image and a previous one of the images being above a preselected threshold; the 3D imaging system generating distance information from at least a preselected fraction of the image; an average distance between the 3D imaging system location and the pile being within a preselected range; a difference in distance between a nearest point in view and a furthest point in view being below a preselected threshold; and an average slope of the pile in view being within a preselected range of being perpendicular to a line of sight from the 3D imaging system.

The positioning system can include or be an antenna/marker of a Global Navigation Satellite System (GNSS), a Differential Global Navigation Satellite System (DGNSS), such as the global positioning system (GPS) with a Differential Global Positioning System (DGPS), or a Universal Total Station (UTS) system.

The processor can be configured for determining a distinct geographic coordinate corresponding to each of the plurality of individual blast fragments by way of determining a distinct geographic coordinate corresponding to each of the plurality of individual blast fragments relative to the reference location in the geographic coordinate system.

The processor can be configured for determining the reference location in the geographic coordinate system by way of:

(i) calculating α from:

$$\alpha \equiv \frac{R_{FM}}{R_{FP}}$$

where $R_{FM}$ is a 3D range between a 3D imaging system location F and a location M of blast fragments and $R_{FP}$ is a 3D range between the 3D imaging system location F and a location of a point P in the centre of the field of view of the 3D imaging system at the same level as the excavation device;

(ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and/or (iv) converting $V_M$ to geographic coordinates by applying the inverse affine transform to the mine coordinates to obtain UTM coordinates, and applying the inverse UTM projection to obtain geographic coordinates.

In accordance with an aspect of the present disclosure, a method for determining the location of blast fragments in a pile of blast fragments includes: providing a 3D imaging system mounted on an excavation device and viewing a portion of a pile of blast fragments and configured for capturing at least one image of the viewed portion of the pile of blast fragments; providing a positioning system configured for providing a location and heading of the excavation device; providing a processor configured to automatically execute program instructions to process signals from the 3D imaging system, including by performing image processing operations upon the at least one image of the viewed portion of the pile of blast fragments, to: identify a location in the viewed portion of the pile of blast fragments; determine the location in a geographic coordinate system; identify a plurality of individual blast fragments in the viewed portion of the pile of blast fragments; and determine a distinct geographic coordinate corresponding to each of the plurality of individual blast fragments.

Determining a distinct geographic coordinate corresponding to each of the plurality of individual blast fragments can include determining a set of coordinates in a mine coordinate system or the Universal Transverse Mercator (UTM) geographic coordinate system.

Providing the 3D imaging system mounted on the excavation device can include configuring the 3D imaging system relative to the excavation device such that during an initial part of each of a plurality of material excavation operations directed to an in situ dig face of the pile of blast fragments: (a) the field of view of the 3D imaging system preferentially views a current in situ dig face; and (b) the 3D imaging system preferentially captures at least one image of the current in situ dig face.

Determining a distinct geographic coordinate corresponding to each of the plurality of individual blast fragments can include determining a distinct geographic coordinate corresponding to each of the plurality of individual blast fragments relative to the reference location in a geographic coordinate system.

Determining the reference location in the geographic coordinate system comprises:

(i) calculating α from:

$$\alpha \equiv \frac{R_{FM}}{R_{FP}}$$

where $R_{FM}$ is a 3D range between a 3D imaging system location F and a location M of blast fragments and $R_{FP}$ is a 3D range between the 3D imaging system location F and a location of a point P in the centre of the field of view of the 3D imaging system at the same level as the excavation device;

(ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and/or (iv) converting $V_M$ to geographic coordinates by applying the inverse affine transform to the mine coordinates to obtain UTM coordinates, and applying the inverse UTM projection to obtain geographic coordinates.

In accordance with an aspect of the present disclosure, a method of defining the geographic coordinates of blast fragments excavated by an excavation device, the excavation device having a 3D imaging system configured for viewing and identifying blast fragments, and a location determined using a positioning system, the method including the steps of:

(i) calculating α from:

$$\alpha \equiv \frac{R_{FM}}{R_{FP}}$$

where $R_{FM}$ is a 3D range between the 3D imaging system location F and a location M of blast fragments and $R_{FP}$ is a 3D range between the 3D imaging system location F and a location of a point P in the centre of the field of view of the 3D imaging system at the same level as the excavation device;

(ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and (iv) converting $V_M$ to geographic coordinates by applying the inverse affine transform to the mine coordinates to obtain UTM coordinates, and applying the inverse UTM projection to obtain geographic coordinates.

In accordance with an aspect of the present disclosure, a system for determining the location of blast fragments in a blast pile includes: a 3D imaging system carried by an excavation device, which for each of a plurality of excavation operations or operation sequences directed to an in situ dig face of the blast pile is specifically configured for viewing and capturing at least one image of the current in situ dig face or a target portion thereof in association with a preliminary or initial stage or part of excavating each load or bucket of blast fragments from the current in situ dig face; a positioning system configured to provide a location and heading of the excavation device; a processor configured to execute program instructions to, for at least one captured image of the current in situ dig face or the target portion thereof: (a) receive, determine, generate, or derive 3D point cloud data corresponding to the at least one captured image of the current in situ dig face or the target portion thereof; (b) identify a plurality of blast fragments within the at least one captured image of the current in situ dig face or the target portion thereof by way of performing image processing operations; and (c) determine or derive geographic coordinates corresponding to the physical space locations of each of the plurality of identified blast fragments by way of processing the 3D point cloud data relative to the location and heading of the excavation device.

In accordance with an aspect of the present disclosure, a process or method for generating 3D georeferenced point cloud data indicating geographic coordinates of blast fragments in a blast pile, the method comprising, for each of a plurality of excavation operations or operation sequences directed to a current in situ dig face of the blast pile: (a) sampling a current in situ dig face of the blast pile in association with a preliminary or initial stage or part of excavating a next load or bucket of blast fragments from the current in situ dig face by way of viewing and capturing at least one image of the current in situ dig face or a target portion T thereof; (b) receiving, determining, generating, deriving, and/or processing 3D point cloud data corresponding to at least one captured image of the current in situ dig face or the target portion T thereof; (c) identifying a plurality of blast fragments within the at least one captured image of the current in situ dig face or the target portion thereof by way of performing image processing operations; and (d) determining or deriving geographic coordinates corresponding to the physical space locations of each of the plurality of identified blast fragments by way of processing such 3D point cloud data relative to the location and heading of the excavation device.

In one aspect, although it need not be the only or indeed the broadest aspect, the present disclosure provides a system for determining locations of blast fragments including:

a 3D imaging system mounted on an excavation device and preferentially or intentionally viewing a pile of blast fragments;

a positional system configured to provide a location and heading of the excavation device;

a processor configured to process signals from the 3D imaging system to identify a location, e.g., first or reference location, which can be a physical space location or relative physical space location, in the pile of blast fragments; and a processor configured to determine the location, e.g., the first or reference location, in a geographic coordinate system.

The viewed pile of blast fragments can preferentially or intentionally correspond to, include, or be a portion, e.g., a specific portion of a blast pile or muck pile, such as an exposed portion or face of a muck pile, which is currently under consideration for estimating, generating, or deriving 3D geographic coordinate positions of at least some blast fragments within the viewed pile of blast fragments, e.g., at least a plurality of blast fragments on or across the viewed portion of the muck pile currently under consideration. In various embodiments, the viewed pile of blast fragments preferentially or intentionally corresponds to, includes, or is a current muck pile dig face, e.g., the current in situ dig face, at which ore-bearing rock or waste rock, e.g., primarily/predominantly ore-bearing rock or primarily/predominantly waste rock) can be removed, e.g., selectively removed, from the muck pile.

The positioning system can suitably include a Differential Global Navigation Satellite System (DGNSS), such as the global positioning system, or another type of positioning system such as a Universal Total Station (UTS) system.

The antenna/marker of the positioning system, e.g., the DGNSS, is suitably located on a particular portion of the excavation device, e.g., the line of a centre pin of the excavation device.

The processor is configured to determine the location, e.g., the first or reference location, in the pile of blast fragments in a coordinate system of the excavation device (referred to herein as the 'excavation device coordinate system' or 'shovel coordinate system') using:

$$v_M = \begin{pmatrix} x_F + \alpha \Delta x \\ \alpha \Delta y \\ z_F + \alpha \Delta z \end{pmatrix}$$

where the parameters have the values described below.

The blast fragments can be or are typically or preferably identified in the pile of blast fragments using image filtering.

The locations of the blast fragments may be expressed in a mine coordinate system.

The mine coordinate system may be converted to a geographic coordinate system by:
  a) applying the inverse affine transform to the mine coordinates to obtain UTM coordinates; and
  b) applying the inverse UTM projection to obtain geographic coordinates.

In a further aspect, particular embodiments of the disclosure include a method of defining the geographic coordinates of blast fragments being excavated or intended or targeted for excavation by an excavation device, the excavation device having a 3D imaging system preferentially or intentionally viewing and identifying blast fragments corresponding to, on, or across an exposed face of a portion of a blast fragment pile or muck pile under consideration, e.g., a current dig face of the muck pile, and a location determined using a positioning system, the method including the steps of:
  (i) calculating $\alpha$ from:

$$\alpha \equiv \frac{R_{FM}}{R_{FP}}$$

where $R_{FM}$ is a 3D range between a 3D imaging system location F and a location M of blast fragments and $R_{FP}$ is a 3D range between the 3D imaging system location F and a location of a point P in the centre of the field of view of the 3D imaging system at the same level as the excavation device;
  (ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and/or
  (iv) converting $V_M$ to global coordinates by:
    applying the inverse affine transform to the mine coordinates to obtain UTM coordinates, and
    applying the inverse UTM projection to obtain geographic coordinates.

The global coordinates can suitably be GPS (global positioning system) coordinates.

Further features and advantages of the present disclosure may become apparent from the detailed description hereinafter.

BRIEF DESCRIPTION OF THE DRAWINGS

To assist in understanding the disclosure and to enable a person skilled in the art to put embodiments of the disclosure into practical effect, preferred embodiments will be described by way of example only with reference to the accompanying drawings, in which.

DETAILED DESCRIPTION

Figure 1:
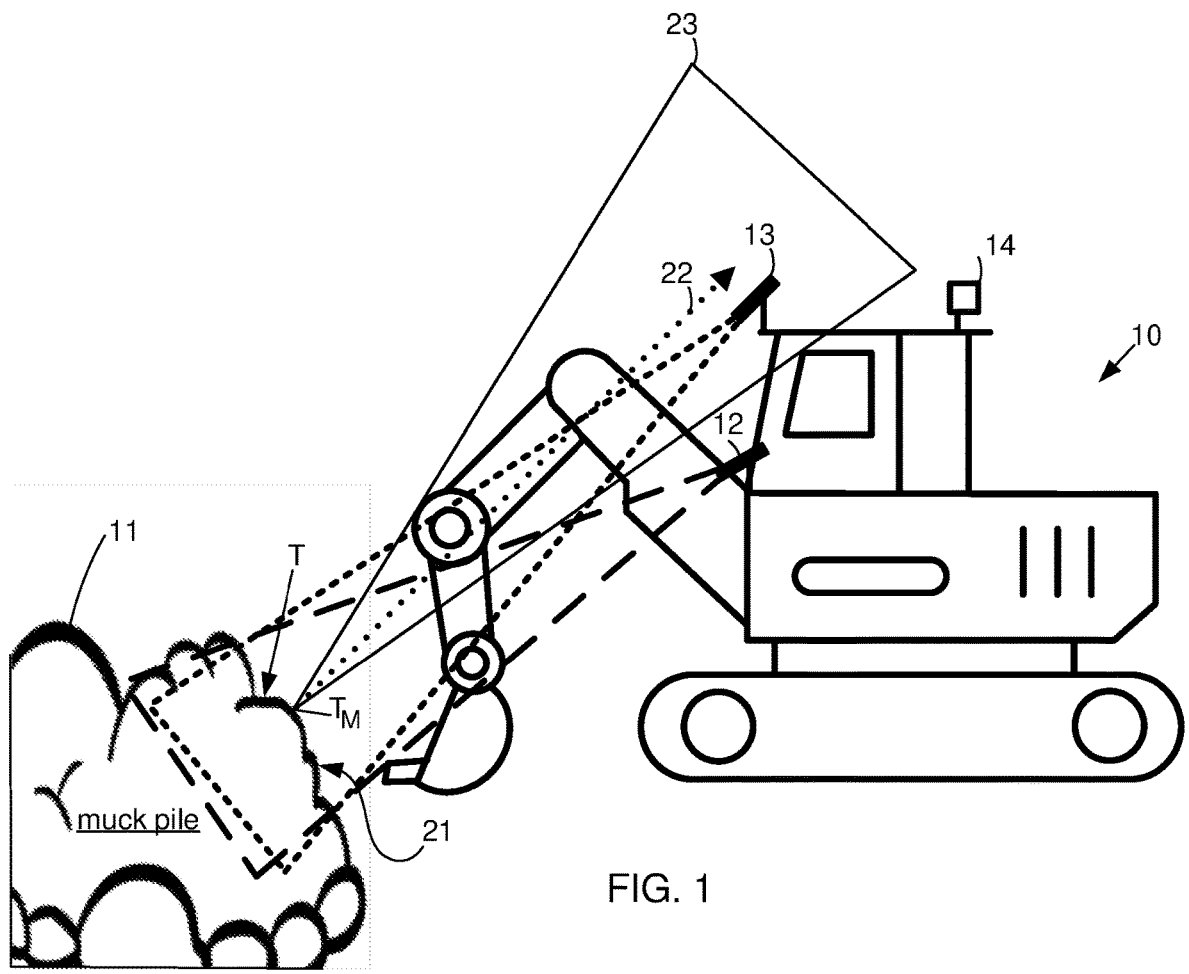
FIG. 1 is a sketch of an excavation device excavating a pile of blast fragments.

Embodiments of the present disclosure provide a system and method for identifying and locating blast fragments in a pile of blast fragments. Accordingly, the integers and method steps have been illustrated in concise schematic form in the drawings, showing only those specific details that are necessary for understanding the embodiments of the present disclosure, but so as not to obscure the disclosure with excessive detail that will be readily apparent to those of ordinary skill in the art having the benefit of the present description.

In this specification, adjectives such as first and second, left and right, and the like may be used solely to distinguish one element or action from another element or action without necessarily requiring or implying any actual such relationship or order. Words such as "comprises" or "includes" are intended to define a non-exclusive inclusion, such that a process, method, article, or apparatus that comprises a list of elements does not include only those elements but may include other elements not expressly listed, including elements that are inherent to such a process, method, article, or apparatus. The presence of "/" in a FIG. or text herein is understood to mean "and/or", i.e., "X/Y" is to mean "X" or "Y" or "both X and Y", unless otherwise indicated.

Referring to FIG. 1 there is shown an excavator device or excavation device 10, which in various embodiments is specifically an excavator or shovel. The excavation device 10 is shown excavating a pile of blast fragments 11, commonly referred to as a muck pile. More particularly, a given or current exposed portion of the muck pile 11 at which material, such as primarily ore-bearing rock or primarily waste rock, is or is intended to be removed, e.g., as part of progressive material removal operations or operation sequences directed to the muck pile in association with which blast fragments are excavated from the muck pile 11, can be defined as a dig face 21, e.g., a current muck pile dig face 21 at which a next material excavation operation or operation sequence is to be directed or performed.

A 3D imaging system 12 is carried by or fixedly mounted on the excavation device 10 so as to clearly view the muck pile 11, e.g., to intentionally, specifically, and/or preferentially view and capture at least one image of the current in situ muck pile dig face 21 in association with or as part of each material removal operation or operation sequence directed to the current in situ muck pile dig face 21. For instance, the 3D imaging system 12 can be intentionally or specifically carried by the excavation device 10 such that it is configured for preferentially viewing and imaging the current in situ dig face 21 of the muck pile 11 and/or a target portion T thereof during an initial phase or part of each of a plurality of excavation operations or operation sequences, e.g., each material excavation operation or operation sequence, directed to the in situ dig face 21. In other words, the 3D imaging system 12 can be intentionally or specifically configured relative to the excavation device 10 such that during a particular part, e.g., a preliminary or initial part, of each of a plurality of material excavation operations or operation sequences directed to blast fragment removal from the in situ dig face 21: (a) the field of view (FOV) of the 3D imaging system preferentially includes or views the current in situ dig face and/or a target portion T thereof, e.g., a generally central or central portion thereof; and (b) the 3D imaging system captures at least one image that intentionally, specifically, and/or preferentially includes the current in situ dig face 21 and/or the target portion T thereof.

Preferentially viewing and imaging the in situ dig face 21 and/or the target portion T thereof can mean configuring the 3D imaging system 12 relative to the excavation device 10 such that at a particular part or portion of a material excavation operation or operation sequence that the excavation device 10 performs upon the current in situ dig face 21, for instance, a preliminary or initial part or portion of the material excavation operation or operation sequence directed to removing a next load or bucket of material from the current in situ dig face 21, e.g., a time interval during which or a point in time at which the excavation device 10 is (re)positioned relative to the in situ dig face 21 and an arm and bucket of the excavation device 10 can initially be moved toward the current in situ dig face 21 and/or the target portion T thereof to extract a load of blast fragments therefrom, the current in situ dig face 21 and/or the target portion T thereof falls generally within or within a middle, central, or centre portion of the 3D imaging system's field of view, possibly, typically, or preferably without significant portions or any portions of the excavation device 10 blocking the 3D imaging system's view of the current in situ dig face 21 and/or the target portion T thereof.

While a particular mounting position at which the 3D imaging system 12 is carried by the excavation device 10 is shown in FIG. 1, the 3D imaging system 12 may be mounted in different other positions relative to the excavation device 10, e.g., as appropriate for the excavation device 10, e.g., in an alternate 3D imaging system position 13, e.g., such that the current in situ dig face and/or the target portion T thereof can be clearly and preferentially viewed and imaged by the 3D imaging system 12 during part, e.g., a preliminary or initial part, of each material excavation operation directed to the in situ dig face 21. A representative alternatively positioned 3D imaging system 13 is also shown in FIG. 1.

In various embodiments of the present disclosure, it can be noted that in an ideal or optimized image capture situation, a midpoint point $T_M$ of a target portion T of the current in situ dig face 21 falls within or at the centre of the 3D imaging system's field of view. However, in accordance with multiple embodiments of the present disclosure, such ideal or optimized positioning of the 3D imaging system 12 relative to the current in situ dig face 21 or the target portion T thereof is not necessary. Rather, embodiments in accordance with the present disclosure can accommodate significant positional variation of the midpoint point $T_M$ of the target portion T of the current in situ dig face 21 relative to the centre of the 3D imaging system's field of view, e.g., relative positional variation across an angular range of approximately +/−10 degrees, 15 degrees, 20 degrees, 25 degrees, or 30 degrees depending upon embodiment details, e.g., about +/−20 degrees, while still determining or generating generally accurate, accurate, or highly accurate geographic coordinates for blast fragments identified in one or more captured images of the current in situ dig face 21 and/or the target portion T thereof. Such angular positioning tolerance or flexibility is indicated by the dashed line 22 having an arrow extending toward the alternatively positioned 3D imaging system 13, and an example angular tolerance range 23, in FIG. 1.

The location of the excavation device 10 can be determined by a positioning system, which in several embodiments can include or be a Global Navigation Satellite System (GNSS), e.g., a Differential Global Navigation Satellite System (DGNSS) and/or the Global Positioning System (GPS). The excavation device 10 may include an antenna/marker 14 mounted on the excavation device 10. The antenna/marker 14 may include a GNSS antenna. DGNSS operates by augmenting GNSS systems with ground-based reference stations. The location of the excavation device centre point may be determined with high accuracy, e.g., possibly within one meter or less. For the purposes of further explanation hereinafter, it may be assumed that location is determined using the GPS and the antenna/marker 14 may include a GPS antenna.

While the GNSS may be a typical or preferred system for determining the location of the excavation device in several embodiments, other types of positioning systems may also be suitable, such as a Universal Total Station (UTS) system (e.g., in underground mining environments). For example, a network of local beacons, e.g., associated with a UTS positioning system, can determine accurate position using triangulation. With appropriate processing, location may also be determined using triangulation from other types of signaling devices, such as mobile phone towers. Accordingly, the antenna/marker 14 may include a wireless location beacon (e.g., Bluetooth or cellular), and/or a survey/ranging unit/module with a total station (TS) or total station theodolite (TST) or universal total station (UTS), e.g., for indoor/underground operation.

The 3D imaging system 12 produces the image of the portion of the muck pile 11 that falls within the field of view (FOV) of the 3D imaging system 12. The FOV may be the field of view of the 3D imaging system 12, which may include a stereo camera and/or a LIDAR system. The FOV may be defined by overlapping camera views of the stereo camera. Reference to "the image" herein can include reference to a set of images captured by the 3D imaging system 12, thus "the image" includes one or a plurality of images. The 3D imaging system 12 can include or be coupled to an image capture/processing system, which includes a processor with one or more digital processing units (e.g., a multicore microprocessor and/or a plurality of processing units for distributed processing), e.g., one or more microprocessors and/or microcontrollers coupled to a memory storing program instructions which when executed can capture the images from the 3D imaging system 12 and process the image datasets corresponding to captured images. In a representative implementation, the 3D imaging system 12 is a FRAGTrack™ camera system available from Orica International Pte Ltd, Singapore. The 3D imaging system 12 may include a processor with sufficient memory and speed to perform the image processing described herein, or the 3D imaging system 12 may transmit the image datasets to a remote image processing system, e.g., a server (referred to as a 'remote server') with sufficient memory and speed configured to perform the image processing described herein, e.g., using a secure data communications protocol and link, which may in part be wireless from the excavation device 10.

Various techniques are available or known for locating and identifying rocks or rock fragments within the 3D image(s). One technique that can be used is the process described in US2019/0012768, referenced above Other suitable approaches may include edge detection (Bedair, A. (1996), 'Digital image analysis of rock fragmentation from blasting', PhD thesis, McGill University, Montreal) or watershed processing (Lei, W. D., Li, K., & Wang, X. P. (2011), 'Improved Watershed Segmentation Method in Rock Fragmentation Analysis on Digital Photos', Advanced Materials Research, vol. 261-263, pp. 1734-1737).

During or in association with muck pile excavation or digging operations, e.g., which are directed to removing material from the muck pile 11 by way of a dig face 21 thereof currently under consideration, the method and system described herein determine a location, e.g., at least one location, in the part or portion of the muck pile 11 within the field of view of the 3D imaging system 12, which in various embodiments includes or is the current muck pile dig face 21 and/or a target portion T thereof, and thus a precise location of each shovel load of blast fragments that is dug or excavated. The full muck pile location can be determined from multiple views that cover the muck pile 11. This information can then be used in mine management to identify the location of ore, characterize the effectiveness of the blast that produced the blast fragments, and to efficiently allocate resources for haulage and processing.

To determine the location of or in the viewed muck pile 11, e.g., the viewed dig face and/or the target portion T thereof, a fusion and transformation of available location data is performed. For the purposes of the following description, lower-case coordinates and vectors (x, v, etc.) refer to the excavation device coordinate system, and upper-case coordinates and vectors (X, V, etc.) refer to a mine coordinate system. For ease of description, reference is made to the excavation device 10 as the excavation device 10.

Referring to FIG. 2 to FIG. 6, relevant locations and quantities around the excavation device 10 include:

A—a location of the antenna/marker 14 on the excavation device 10, relative to a fixed body/frame of the excavation device 10;
F—a location of The 3D imaging system 12 on the excavation device 10;
P—a location of a point on a pit floor in the centre of the field of view of the 3D imaging system 12;
M—a location of a point on the muck pile 11 in the centre or approximately in the centre of the field of view of the 3D imaging system 12;
φ—the 3D imaging system's down-angle (positive downwards from horizontal);
B—the excavation device's heading (positive clockwise);
L—the excavation device's centre line; and
⊖—a Constant angle between line L and the y-axis of the excavation device coordinate system.

Figure 2:
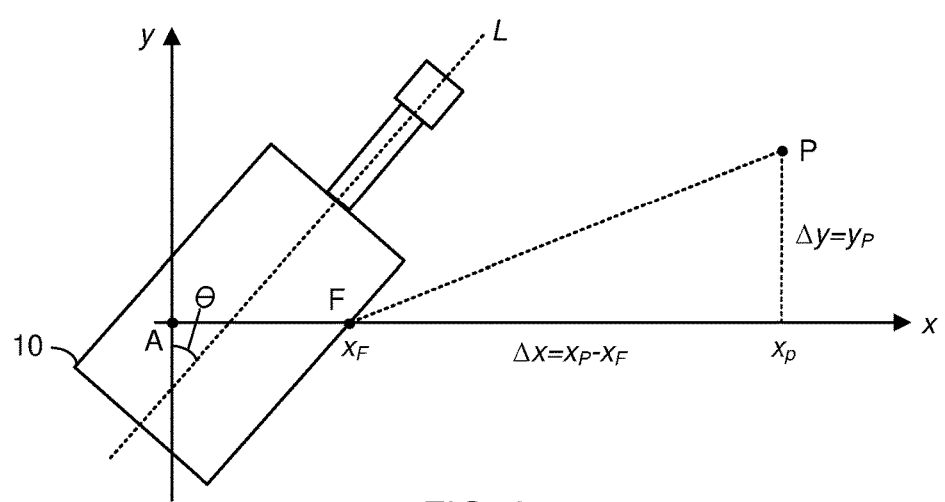
FIG. 2 is a plan view schematic of the key positions in the sketch of FIG. 1.

As shown in FIG. 2, a right-handed coordinate system (the excavation device coordinate system) local to the excavation device 10 is defined such that the origin is at the location of the antenna/marker A and the positive x-axis passes through the 3D imaging system head F (and thus the 3D imaging system's position can be correlated with a known location on the excavation device 10). Assume initially that the excavation device 10 is parked up, and the 3D imaging system 12 is pointing towards P, a point on the pit floor in the centre of the 3D imaging system's field of view.

Regardless of the motion of the excavation device 10, the points A, F and P have the following constant coordinates in the excavation device coordinate system:

$$v_A \equiv \begin{pmatrix} 0 \\ 0 \\ 0 \end{pmatrix}, v_F \equiv \begin{pmatrix} x_F \\ 0 \\ z_F \end{pmatrix}, v_P \equiv \begin{pmatrix} x_P \\ y_P \\ z_P \end{pmatrix}. \tag{1}$$

In practice, for the embodiment of FIG. 1, the 3D imaging system 12 may be lower than the antenna/marker 14, and the point P will be lower still. Thus $0 \geq z_F > z_P$.

Figure 3:
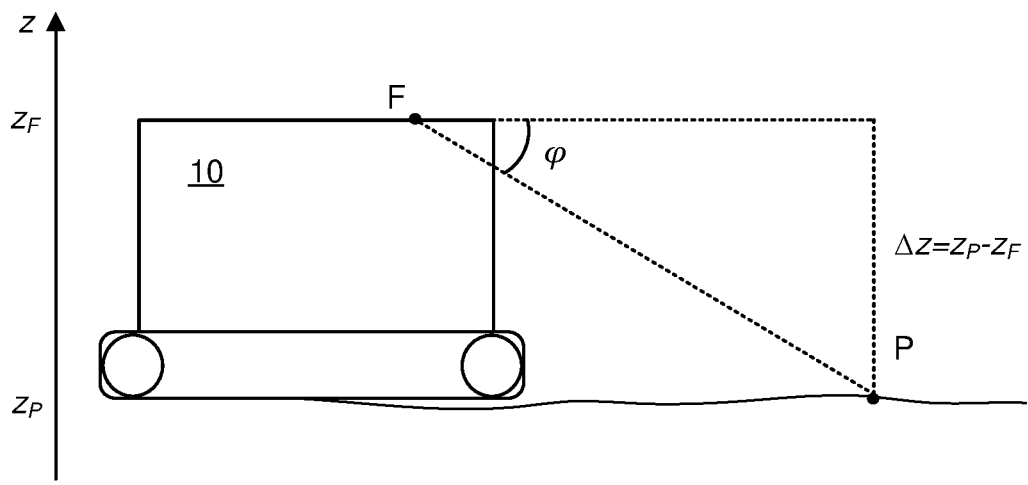
FIG. 3 is a side view schematic of the key positions in the sketch of FIG. 1.

The relationship between F and P is shown in FIG. 3, together with the angle φ. The following quantities are constants in all coordinate systems (including the excavation device coordinate system and the mine coordinate system) since they depend only on differences between coordinates:

3D range from $F$ to $P \equiv R_{FP} = |v_F - v_P| =$
$$\sqrt{(\Delta x)^2 + (\Delta y)^2 + (\Delta z)^2} \tag{2}$$

$$\text{Camera down-angle } \varphi = \tan^{-1} \frac{\Delta z}{\sqrt{(\Delta x)^2 + (\Delta y)^2}}. \tag{3}$$

Figure 4:
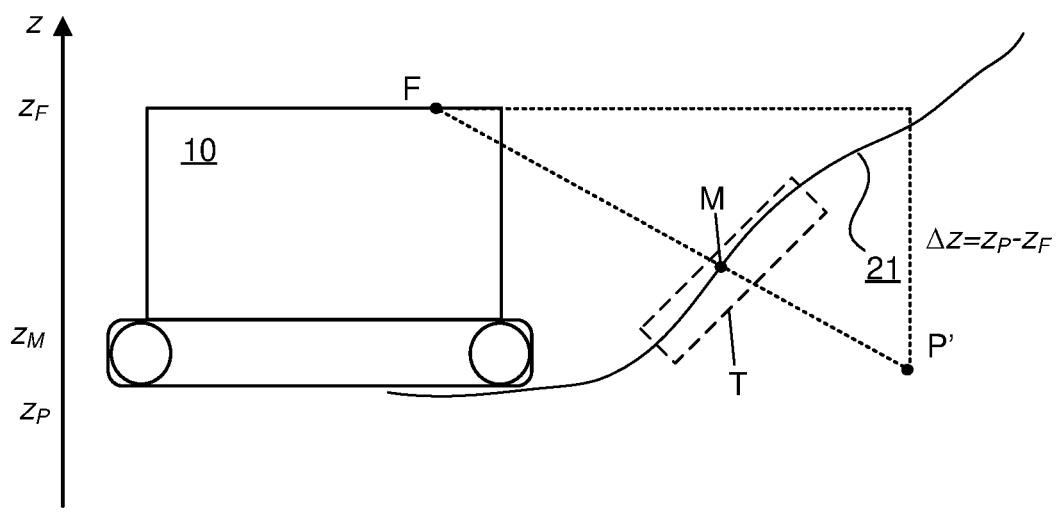
FIG. 4 is a side view schematic of the key positions in the sketch of FIG. 1 with a pile of blast fragments.

When the excavation device 10 is digging, and the imaging system triggers the 3D imaging system 12 when the FOV includes the view of the muck pile, within which, e.g., in the approximate centre or the centre of which, is the point M, as shown in FIG. 4. The point P is where the line FM extended would meet the pit floor at a distance Δz below the 3D imaging system 12 if the muck pile 11 were not present.

$R_{FM}$ is the 3D range between F and M as measured by the imaging system, and:

$$\alpha \equiv \frac{R_{FM}}{R_{FP}}. \quad (4)$$

Figure 5:
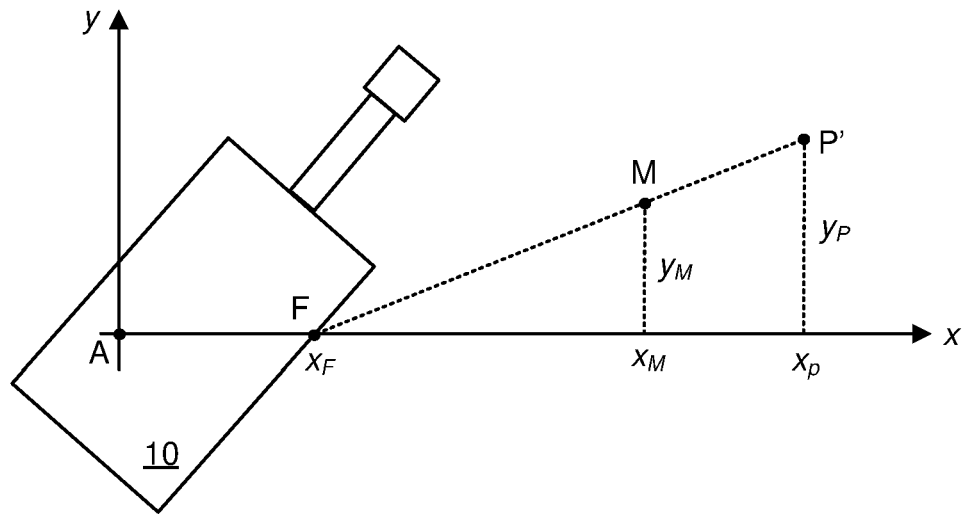
FIG. 5 is a plan view schematic of the sketch of FIG. 4.

Then, by similar triangles in FIG. 4 and FIG. 5 the coordinates of M in the excavation device coordinate system are:

$$v_M = \begin{pmatrix} x_F + \alpha \Delta x \\ \alpha \Delta y \\ z_F + \alpha \Delta z \end{pmatrix}. \quad (5)$$

Figure 6:
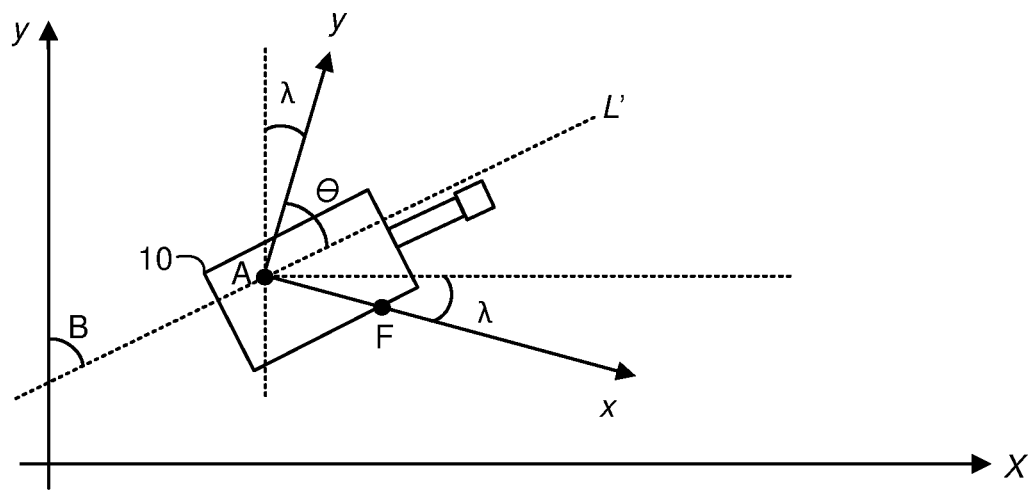
FIG. 6 shows an excavation device in a mine coordinate system.

In the mine coordinate system, the excavation device 10 can be at an arbitrary location and orientation, as shown in FIG. 6. In the mine coordinate system, the points A, F and P, are at:

$$V_A \equiv \begin{pmatrix} X_A \\ Y_A \\ Z_A \end{pmatrix}, V_F \equiv \begin{pmatrix} X_F \\ Y_F \\ Z_F \end{pmatrix}, V_P \equiv \begin{pmatrix} X_P \\ Y_P \\ Z_P \end{pmatrix}. \quad (6)$$

and the line L' passes through A and is parallel to the excavation device centre line.

The angle of rotation $\lambda$ of the excavation device coordinate system relative to the mine coordinate system is:

$$\lambda \equiv \tan^{-1} \frac{\Delta Y}{\Delta X} = \tan^{-1} \frac{Y_F - Y_A}{X_F - X_A} \quad (7)$$

but from FIG. 6 it is also evident that:
B=$\lambda$+$\theta$ and therefore $$\theta = B - \tan^{-1} \frac{\Delta Y}{\Delta X}. \quad (8)$$

Conversion of a vector v from the excavation device coordinate system to corresponding vector V the mine coordinate system is performed by:

$$V = Rv + V_A \text{ where} \quad (9)$$

$$R \equiv \begin{pmatrix} \cos\lambda & \sin\lambda & 0 \\ -\sin\lambda & \cos\lambda & 0 \\ 0 & 0 & 1 \end{pmatrix} \quad (10)$$

and the reverse transformation from the mine coordinate system to the excavation device coordinate system is performed by:

$$v = R^{-1}(V - V_A) = R^T(V - V_A). \quad (11)$$

The matrix R can be expressed in terms of excavation device heading B and the constant angle $\theta$:

$$R = \begin{pmatrix} \cos(B-\theta) & \sin(B-\theta) & 0 \\ -\sin(B-\theta) & \cos(B-\theta) & 0 \\ 0 & 0 & 1 \end{pmatrix}. \quad (12)$$

To convert the location information to geographic coordinates, rather than mine coordinates (in the mine coordinate system), a further transformation is used. In some applications, transformation equations between mine coordinates and geographic coordinates may already exist. If they do not exist, they can be derived as long as the coordinates of at least three points are known in both the mine coordinate system and a geographic coordinate system, such as the Universal Transverse Mercator (UTM) geographic coordinate system. An affine transformation is used to convert mine coordinates to geographic coordinates. The process uses the following steps:
 a) convert the control points' GPS coordinates to Cartesian, for example via a UTM projection using the WGS84 datum; and
 b) feed the control points' UTM and mine coordinates to an algorithm, which produces a 7-parameter (affine) transform between the two Cartesian systems (for example, Zeng 2010; H. Zeng—A 3D Coordinate Transformation Algorithm. Proceedings of $2^{nd}$ Conference on Environmental Science and Information Application Technology, p. 195 (2010)).

If more than three control points are known, Zeng's algorithm provides a least-squares solution and an error estimate.

The conversion process from geographic to mine coordinates then includes the following steps:
 a) convert the geographic coordinates to Cartesian via UTM projection; and
 b) apply the affine transform to the UTM coordinates to obtain mine coordinates.

The conversion process from mine to geographic coordinates then includes the following steps:
 a) apply the inverse affine transform to the mine coordinates to obtain UTM coordinates; and
 b) apply the inverse UTM projection to obtain geographic coordinates.

Using the process outlined hereinbefore, the precise locations of the excavation device's antenna/marker 14, the 3D imaging system 12 and the point P, are known, as is the excavation device heading B. From this information it is possible to:
 a) calculate the (constant) angle $\theta$ from eq. (8);
 b) calculate the rotation matrix R from eq. (12);
 b) calculate the (constant) distance $R_{FP}=|V_F-V_P|$ between the 3D imaging system and point P; and
 c) calculate the (constant) coordinates $v_F$ and $v_P$ of the 3D imaging system and point P in the excavation device coordinate system from eq. (11).

Once the excavation device 10 commences operation and is digging the muck pile 11, and the imaging system triggers, the herein described method and system obtain from the high-precision GNSS feed the location VA of the antenna/marker 14 (in mine coordinates) and the excavation device heading B, and obtain from the 3D imaging system 12 the 3D range (RFM) to M, the point on the muck pile in the centre of the 3D imaging system's field of view. When the excavation device 10 is digging, the imaging system triggers the 3D imaging system 12 when the FOV includes the view of the muck pile, as described hereinbefore. The 3D imaging system is be specifically configured for being triggered, and for preferentially capturing in response to being triggered. The imaging system triggers the 3D imaging system 12, and/or the processing of the set of images captured thereby, in response to: (a) some or all of a number of selection parameters including image quality and geometry being automatically determined by the imaging system (which may be referred to as 'automatic triggering'), and/or (b) a manual activation signal from an operator of the excavator device 10, e.g., where the imaging system generates a display for the operator to see what is the FOV. The automatic triggering may include 3D imaging system can be specifically configured for manually and/or automatically triggering the image processing operations (to process the signals). The 3D imaging system can be specifically configured for automatically triggering the image processing operations based on one or more of the following trigger criteria being met by the at least one captured image: an exposure value of the at least one image being within a preselected range—e.g., for a stereo camera, the left/right image pair must be properly exposed, not too bright or dark; a measured difference between the image and a previous one of the images being above a preselected threshold—thus the images must have changed by more than a minimum threshold since the last results were produced, to avoid repeatedly triggering on a static scene; the 3D imaging system generating distance information from at least a preselected fraction of the image—e.g., for a stereo camera, the 3D image constructed from the left/right pair must contain a sufficient amount of usable distance information across the region of stereo overlap, for example above 90%; an average distance between the 3D imaging system location and the pile being within a preselected range—e.g., for a stereo camera, the average distance between the camera and the material in view (calculated from the 3D image) must lie within minimum and maximum limits, for example 8 m to 12 m; a difference in distance between a nearest point in view and a furthest point in view being below a preselected threshold—thus the difference in distance between the nearest and furthest point in view must be below a threshold, for example 2.5 m; and an average slope of the pile in view being within a preselected range of being perpendicular to a line of sight from the 3D imaging system—thus the average slope of the material in view must be close to perpendicular to the camera's line of sight, for example less than a 20 degree deviation. The automatic triggering may allow the system and method described herein to select the image(s) for process substantially autonomously, and to select only images that are likely to produce usable results at each step, e.g., to maximize the likelihood that the system processes only images of the in situ dig face and not of unwanted objects, such as when a load truck comes into view of the stereo camera during the shovel's dig/swing/dump cycle. A further criterion can be that the system is not already engaged on a processing job (i.e., not already processing the image(s).

The 3D imaging system 12 thus may provide for continuous imaging of the in situ muck pile which is constantly changing during digging, thus making it otherwise difficult to image what is in the muck pile.

The following steps then exactly define the geographic coordinates of the blast fragments excavated by the excavation device 10:

1. calculate $\alpha$ from eq. (4);
2. calculate $v_M$ from eq. (5);
3. convert $v_M$ to mine coordinates $V_M$ via eqs. (9) and (12); and
4. convert $V_M$ to global (GPS) coordinates.

Figure 7:
FIG. 7 shows a Field of View of a 3D imaging system of a muck pile.
Figure 8:
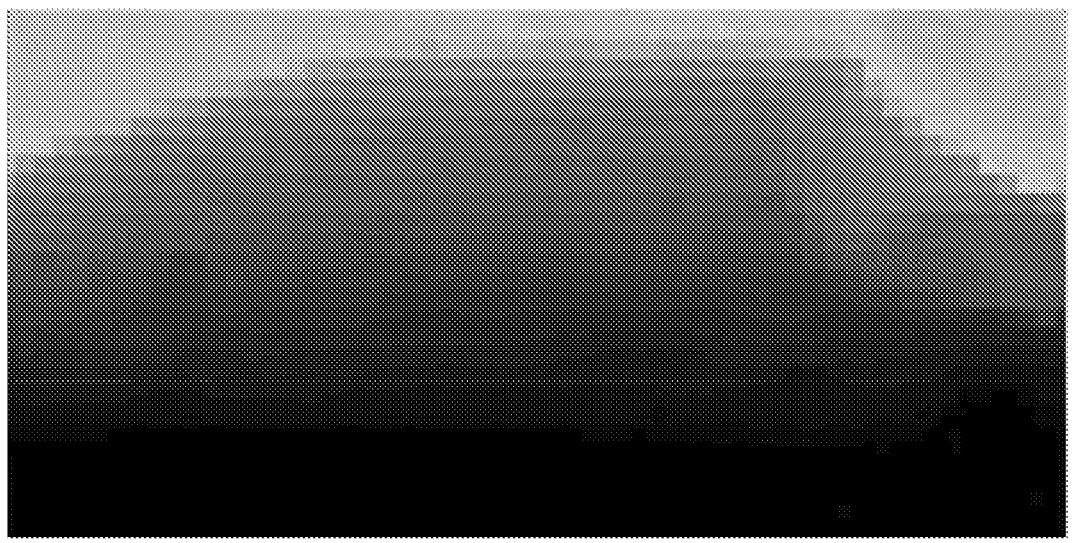
FIG. 8 shows a range image derived from the image of FIG. 7, indicating 3D or depth range variations or offsets relative to a location, e.g., a physical space location, determined based on the image of FIG. 7.

The above description refers to determining or deriving a target location, e.g., a target physical space location corresponding to the approximate centre or centre M within a captured image of the current in situ dig face 21 or the target portion T thereof, but greater efficacy may be achieved if particular rock fragments (which can be ore-bearing rock fragments or waste rock fragments), e.g., multiple individual rock fragments, can be located within the field of view. This may be achieved through dividing the field of view into a grid of pixels. FIG. 7 shows an image of a muck pile 11 recorded with a 3D imaging system 12. As described above, the range to the centre of the image is determined by the 3D imaging system. FIG. 8 is a range image derived from the image of FIG. 7, indicating 3D or depth range variations or offsets relative to the location M, e.g., determined based on the image of FIG. 7. As shown in FIG. 8, the image is divided into pixels according to a pattern such as a grid pattern, which in several embodiments can be an arbitrary grid pattern. In the example, the grid is Cartesian with a grid size of 10 cm by 10 cm. Other sizes and grid shapes would also be suitable.

Figure 9:
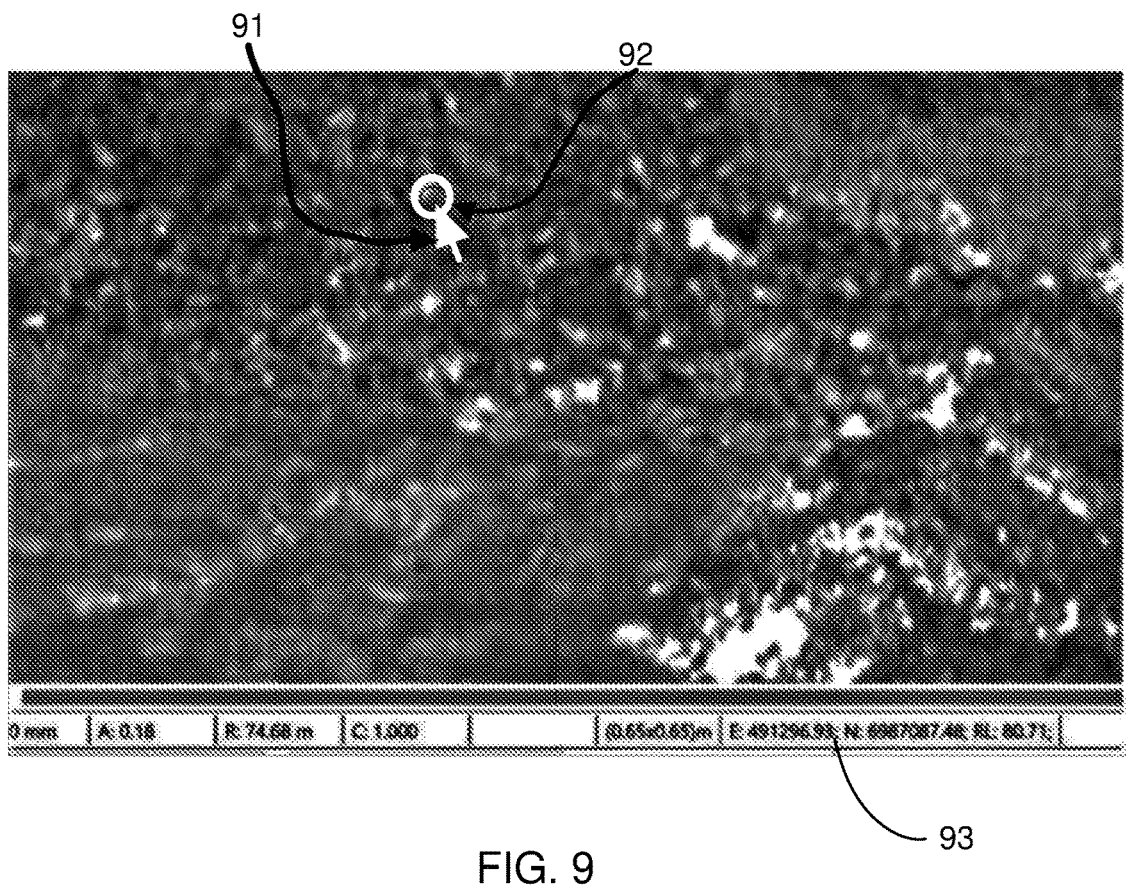
FIG. 9 shows georeferencing a fragment in the image of FIG. 8.

Using image identification techniques, individual rock fragments are identified and associated or matched with the closest grid, e.g., the closest grid element in the grid pattern. Suitable image identification techniques include edge detection, spectral analysis, shape analysis or segmentation through algorithms such as Watershed. Each identified fragment is then allocated a georeferenced location, e.g., relative to the location M and the grid element to which the fragment has been associated or matched. FIG. 9 shows a display of the muck pile of FIG. 7 with a pointer 91 indicating a fragment 92, e.g., a particular individual fragment. The geolocation of the fragment 92 is displayed in frame 93. In this example it is Easting: 491296.93, Northing: 6987087 and Relative Level: 80.71. The coordinate system of the selected fragment 92 in this example is in the Global coordinate system and is derived using this algorithm and the input excavation device centre position provided in the global coordinate system. These values may be relative to a national map grid or may be relative to a local mine coordinate system.

Figure 10:
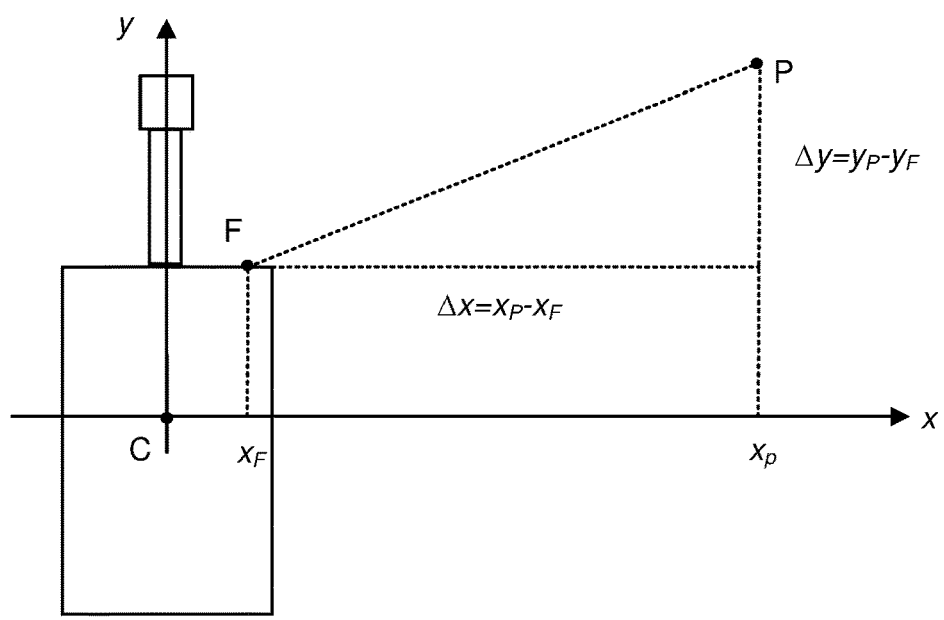
FIG. 10 is a plan view schematic of an alternative to FIG. 2.

The process described may be simplified somewhat if the antenna/marker 14 (e.g., the precision GNSS antenna) is located at the excavation device's centre pin so that the GNSS feed provides the location of the excavation device's centre pin and the excavation device's relative heading. In this case, the correction from A is not required. The alternate approach is depicted in FIG. 10, in which the excavation device centre pin location is given as C and other points are as previously described.

Equation (1) above will be redrawn as:

$$v_C \equiv \begin{pmatrix} 0 \\ 0 \\ 0 \end{pmatrix}, v_F \equiv \begin{pmatrix} x_F \\ y_F \\ z_F \end{pmatrix}, v_P \equiv \begin{pmatrix} x_P \\ y_P \\ z_P \end{pmatrix}.$$

Figure 11:
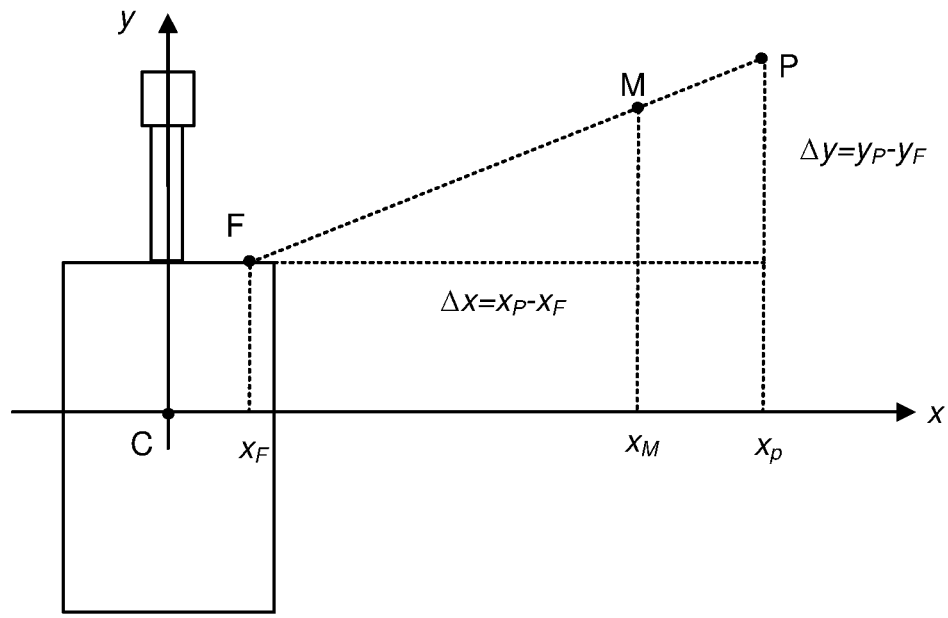
FIG. 11 is a plan view schematic of an alternative to FIG. 5.
Figure 12:
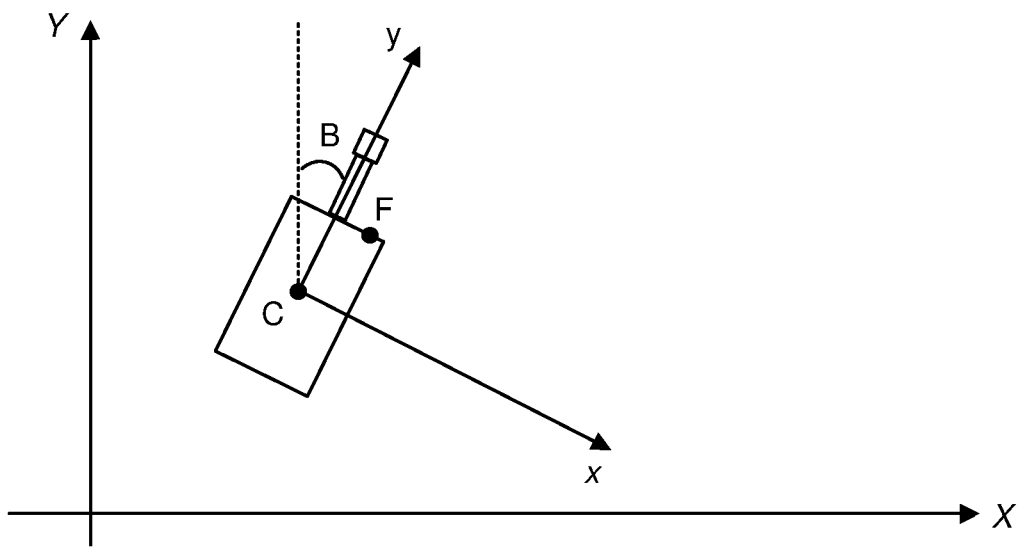
FIG. 12 is a plan view schematic of an alternative to FIG. 6.

The alternate depiction to FIG. 5 is shown in FIG. 11 and the alternate of FIG. 6 is shown in FIG. 12. From these figures it is evident that the location of C, F and P in the excavation device coordinate system are:

$$V_C \equiv \begin{pmatrix} X_C \\ Y_C \\ Z_C \end{pmatrix}, V_F \equiv \begin{pmatrix} X_F \\ Y_F \\ Z_F \end{pmatrix}, V_P \equiv \begin{pmatrix} X_P \\ Y_P \\ Z_P \end{pmatrix}$$

and the quantity $\beta$ is no longer relevant. The angle of rotation of the excavation device system relative to the mine system is equal to the excavation device heading B, hence the transformation from excavation device coordinates to mine coordinates is given by:

$$V = Rv + V_C \text{ where } R \equiv \begin{pmatrix} \cos B & \sin B & 0 \\ -\sin B & \cos B & 0 \\ 0 & 0 & 1 \end{pmatrix}$$

and the inverse transformation from mine to excavation device coordinates is therefore:

$$v = R^{-1}(V-V_C) = R^T(V-V_C).$$

As is evident, locating the antenna/marker 14 at the excavation device's centre point has certain advantages, but this is not always possible. In many cases the more general process is required.

In association with or in addition or as an alternative to the foregoing, for each of a plurality of muckpile excavation operations or operation sequences directed to an in situ muck pile dig face 21, multiple system and method embodiments in accordance with the present disclosure are configurable or configured for receiving, determining, generating, deriving, and/or processing 3D point cloud data corresponding to each current in situ dig face 21, and generating, determining, or deriving 3D georeferenced point cloud data corresponding to each current in situ dig face 21 by way of: (a) sampling each current in situ dig face 21 of the muck pile 11 in association with a preliminary or initial stage or part of excavating or removing a next load or bucket of blast fragments from the current in situ dig face 21, where such sampling includes or occurs by way of viewing and capturing at least one image of the current in situ dig face 21 or a target portion T thereof with the 3D imaging system 12; (b) receiving, determining, generating, deriving, and/or processing 3D point cloud data corresponding to at least one captured image (selected by the triggering) of the current in situ dig face 21 or the target portion T thereof, e.g., where such 3D point cloud data can be generated by or produced or provided by way of the 3D image(s) captured by the 3D imaging system 12; (c) identifying a plurality of blast fragments within the at least one captured image of the current in situ dig face 21 or the target portion T thereof by way of performing image processing operations, e.g., upon the 3D point cloud data corresponding to the at least one captured image of the current in situ dig face 21; and (d) determining or deriving geographic coordinates, e.g., a set of local mine coordinates and/or a set of UTM coordinates, corresponding to the physical space locations of each of the plurality of identified blast fragments by way of processing such 3D point cloud data relative to the location and heading of the excavation device. Determining or deriving such geographic coordinates can be performed by way of one or more processors or processing units configured for executing program instructions that carry out processes, algorithms, or steps described above.

The 3D imaging system 12 includes optical components and imaging elements that are configured/arranged to define the FOV and generating the image data of the portion of the muck pile in the FOV when the 3D imaging system 12 captures the image of the viewed portion of the pile. The 3D imaging system 12 may be described as an "optical 3D scanner" that optically provides the point cloud of geometric samples on the surface formed by the viewed portion of the pile, e.g., by range imaging with the stereo camera (or 'stereoscopic camera') and/or the LIDAR system (a "light detection and ranging" system) of the 3D imaging system. The location of the 3D imaging system, from the perspective of the FOV and the captured images, is the location of an optical input to the optical components and imaging elements, e.g., the front lens of the stereo camera or front detector of the LIDAR system.

In view of the foregoing, as will be clear to persons having ordinary skill in the art the embodiments of systems and methods described herein provide for automatic georeferencing of specific captured frames, e.g., every captured frame or every triggered frame, from the 3D imaging system 12, which in turn allows detailed analysis of the result of a blast as well as detailed planning of downstream hauling and processing requirements. The system and method described herein can involve, include, or provide automatic georeferencing of rock fragments of each or every in situ dig face 21 that the 3D imaging system 12 captures or captured during material excavation operations directed to the muck pile 11. The method and system disclosed herein may significantly enhance the efficiency of mining operations leading to environmental and economic benefits.

The above description of various embodiments is provided for purposes of description to one of ordinary skill in the relevant art. It is not intended to be exhaustive or to necessarily limit the invention to a single disclosed embodiment. As mentioned, alternatives and variations to the described embodiment may be apparent to those skilled in the relevant art. Accordingly, while some alternative embodiments have been discussed specifically, other embodiments may be apparent or relatively easily developed by those of ordinary skill in the art. Accordingly, this disclosure is intended to embrace all alternatives, modifications and variations that have been described herein, and other embodiments that fall within the spirit and scope of the disclosure.

The invention claimed is:

1. A system for determining locations of blast fragments in a pile of blast fragments produced in association with or resulting from mining operations, the system comprising:
   a three-dimensional (3D) imaging system mounted on an excavation device and configured for viewing a portion of a pile of blast fragments and configured for capturing at least one image of the viewed portion of the pile of blast fragments;
   a positioning system configured for providing a location and heading of the excavation device;
   a processor configured to execute program instructions to process signals from the 3D imaging system and the positioning system, including by performing image processing operations upon the at least one image of the viewed portion of the pile of blast fragments, to:
      identify a reference location in the viewed portion of the pile of blast fragments;
      determine the reference location in a geographic coordinate system using the location and heading of the excavation device;
      identify a plurality of individual blast fragments in the viewed portion of the pile of blast fragments;
      associate or match individual blast fragments with closest grid elements in a grid pattern; and
   determine a distinct geographic coordinate corresponding to each of the plurality of individual blast fragments by way of allocating to each identified blast fragment a georeferenced location relative to the reference location coordinate system and a grid element with which the blast fragment has been associated or matched.

2. The system of claim 1, wherein each distinct geographic coordinate comprises a set of coordinates in a mine coordinate system or a Universal Transverse Mercator (UTM) geographic coordinate system.

3. The system of claim 1, wherein the viewed portion of the pile of blast fragments comprises a current in situ dig face of a muck pile to which material excavation operations are to be directed.

4. The system of claim 3, wherein the 3D imaging system is intentionally/specifically configured for viewing and imaging the current in situ dig face of the pile of blast fragments.

5. The system of claim 4, wherein the 3D imaging system is intentionally/specifically configured relative to the excavation device such that during an initial part of each of a plurality of material excavation operations directed to the in situ dig face, (a) a field of view of the 3D imaging system views the current in situ dig face and/or a target portion thereof; and (b) the 3D imaging system captures an image of the current in situ dig face and/or a target portion thereof.

6. The system of claim 3, wherein the 3D imaging system is configured to manually and/or automatically trigger the image processing operations, to select one of the at least one captured images for the processing, including automatically triggering the image processing operations based on one or more of the following trigger criteria being met by the at least one captured image:
- an exposure value of the at least one image being within a preselected range;
- a measured difference between the image and a previous one of the images being above a preselected threshold;
- the 3D imaging system generating distance information from at least a preselected fraction of the image;
- an average distance between a location of the 3D imaging system and the pile being within a preselected range;
- a difference in distance between a nearest point in view and a furthest point in view being below a preselected threshold; and
- an average slope of the pile in view being within a preselected range of being perpendicular to a line of sight from the 3D imaging system.

7. The system of claim 1, wherein the positioning system comprises an antenna/marker of a Global Navigation Satellite System (GNSS), or a Universal Total Station (UTS) system.

8. The system of claim 1, wherein the processor is configured for determining a distinct geographic coordinate corresponding to each of the plurality of individual blast fragments by way of determining a distinct geographic coordinate corresponding to each of the plurality of individual blast fragments relative to the reference location in the geographic coordinate system.

9. The system of claim 1, wherein the processor is configured for determining the reference location in the geographic coordinate system by way of:

(i) calculating $\alpha$ from:

$$\alpha \equiv \frac{R_{FM}}{R_{FP}}$$

where $R_{FM}$ is a 3D range between a 3D imaging system location F and a location M of blast fragments and $R_{FP}$ is a 3D range between the 3D imaging system location F and a location of a point P in the centre of the field of view of the 3D imaging system at the same level as the excavation device;

(ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$V = Rv + V_A$ and $$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and/or (iv) converting $V_M$ to geographic coordinates by applying the inverse affine transform to the mine coordinates to obtain UTM coordinates, and applying the inverse UTM projection to obtain geographic coordinates.

10. The system of claim 1, wherein the processor is configured to execute program instructions to, for the at least one image:
(a) receive, determine, generate, or derive 3D point cloud data corresponding to the at least one image;
(b) identify a plurality of individual blast fragments within the at least one image; and
(c) determine or derive geographic coordinates corresponding to the physical space locations of each of the plurality of identified blast fragments by way of processing the 3D point cloud data relative to the location and heading of the excavation device.

11. The system of claim 1, wherein the processor is further configured to execute program instructions to derive a range image from the at least one image of the viewed portion indicating 3D or depth range variations or offsets, optionally including dividing the range image into pixels according to a pattern, optionally a grid pattern, which is optionally an arbitrary grid pattern.

12. The system of claim 11, wherein the processor is further configured to execute program instructions to identify individual blast fragments and to associate or match the identified individual blast fragments with the closest grid, optionally a closest grid element in the grid pattern, such that each identified fragment is allocated a georeferenced location, optionally relative to the reference location and the grid element to which the fragment has been associated or matched.

13. A method for determining a location of blast fragments in a pile of blast fragments produced in association with or resulting from mining operations, the method comprising:
- providing a 3D imaging system mounted on an excavation device and viewing a portion of a pile of blast fragments and configured for capturing at least one image of the viewed portion of the pile of blast fragments;
- providing a positioning system configured for providing a location and heading of the excavation device;
- providing a processor configured to automatically execute program instructions to process signals from the 3D imaging system and the positioning system, including by performing image processing operations upon the at least one image of the viewed portion of the pile of blast fragments, to:
- identify a reference location in the viewed portion of the pile of blast fragments;
- determine the reference location in a geographic coordinate system using the location and heading of the excavation device;
- identify a plurality of individual blast fragments in the viewed portion of the pile of blast fragments;
- associate or match individual blast fragments with closest grid elements in a grid pattern; and determine a distinct geographic coordinate corresponding to each of the plurality of individual blast fragments by way of allocating to each identified blast fragment a georeferenced location relative to the reference location in the geographic coordinate system and a grid element with which the blast fragment has been associated or matched.

14. The method of claim 13, wherein determining a distinct geographic coordinate corresponding to each of the plurality of individual blast fragments comprising determining a set of coordinates in a mine coordinate system or a Universal Transverse Mercator (UTM) geographic coordinate system.

15. The method of claim 13, wherein providing the 3D imaging system mounted on the excavation device comprises configuring the 3D imaging system relative to the excavation device such that during an initial part of each of a plurality of material excavation operations directed to an in situ dig face of the pile of blast fragments (a) a field of view of the 3D imaging system views a current in situ dig face, and (b) the 3D imaging system captures an image of the current in situ dig face.

16. The method of claim 13, wherein determining a distinct geographic coordinate corresponding to each of the plurality of individual blast fragments comprises determining a distinct geographic coordinate corresponding to each of the plurality of individual blast fragments relative to a reference location in a geographic coordinate system.

17. The method of claim 13, wherein determining the reference location in the geographic coordinate system comprises:

(i) calculating $\alpha$ from:

$$\alpha \equiv \frac{R_{FM}}{R_{FP}}$$

where $R_{FM}$ is a 3D range between a 3D imaging system location F and a location M of blast fragments and $R_{FP}$ is a 3D range between the 3D imaging system location F and a location of a point P in the centre of the field of view of the 3D imaging system at the same level as the excavation device;

(ii) calculating $v_M$ from:

$$v_M = \begin{pmatrix} x_F + \alpha \Delta x \\ \alpha \Delta y \\ z_F + \alpha \Delta z \end{pmatrix}$$

where $x_F$ is an x coordinate of the point F, $\Delta x$ is a distance between point F and point P along an x-axis, $\Delta y$ is a distance between point F and point P along a y-axis, $z_F$ is a z coordinate of the point F, and $\Delta z$ is a distance between point F and point P along a z-axis;

(iii) converting $v_M$ to mine coordinates $V_M$ from:

$V = Rv + V_A$ and $$V = Rv + V_A \text{ and } R = \begin{pmatrix} \cos(B-\theta) & \sin(B-\theta) & 0 \\ -\sin(B-\theta) & \cos(B-\theta) & 0 \\ 0 & 0 & 1 \end{pmatrix};$$

and/or
and (iv) converting $V_M$ to geographic coordinates by applying the inverse affine transform to the mine coordinates to obtain UTM coordinates, and applying the inverse UTM projection to obtain geographic coordinates.

18. The method of claim 13, including generating 3D georeferenced point cloud data indicating geographic coordinates of blast fragments in a blast pile, the method comprising, for each of a plurality of excavation operations or operation sequences directed to a current in situ dig face of the blast pile:

(a) sampling a current in situ dig face of the blast pile in association with a preliminary or initial stage or part of excavating a next load or bucket of blast fragments from the current in situ dig face by way of viewing and capturing at least one image of the current in situ dig face or a target portion T thereof;

(b) receiving, determining, generating, deriving, and/or processing 3D point cloud data corresponding to at least one captured image of the current in situ dig face or the target portion T thereof;

(c) identifying a plurality of blast fragments within the at least one captured image of the current in situ dig face or the target portion thereof by way of performing image processing operations; and (d) determining or deriving geographic coordinates corresponding to physical space locations of each of the plurality of identified blast fragments by way of processing such 3D point cloud data relative to a location and heading of an excavation device.

19. The method of claim 18, wherein the processor is further configured to execute program instructions to identify individual blast fragments and to associate or match the identified individual blast fragments with the closest grid, optionally a closest grid element in the grid pattern, such that each identified fragment is allocated a georeferenced location, optionally relative to the reference location and the grid element to which the fragment has been associated or matched.

20. The method of claim 13, further comprising deriving a range image from the at least one image of the viewed portion indicating 3D or depth range variations or offsets, optionally including dividing the range image into pixels according to a pattern, optionally a grid pattern, which is optionally an arbitrary grid pattern.

* * * * *